Figure 1:
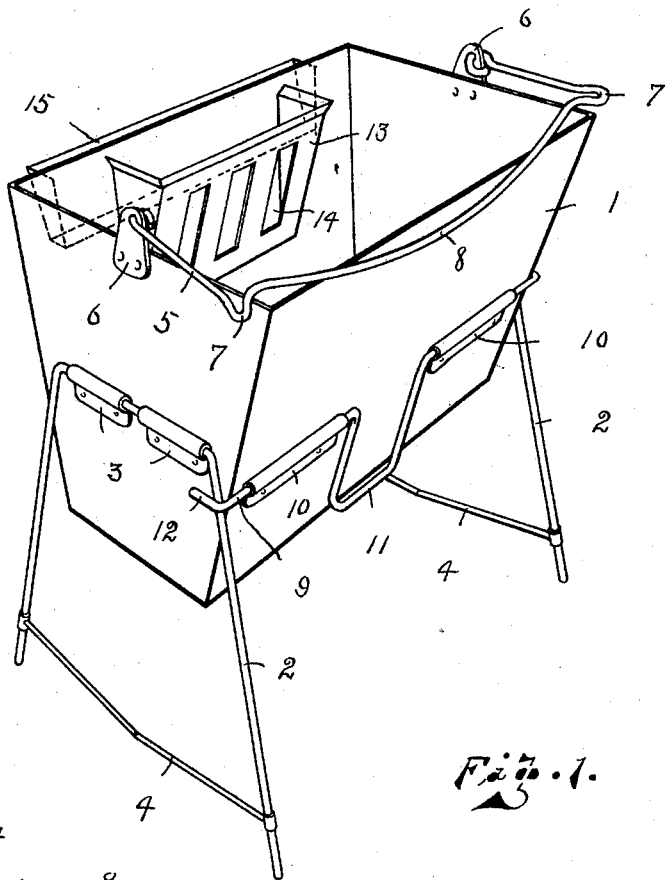

April 14, 1931.  J. E. ROOS  1,801,055
PASTE POT
Filed Aug. 13, 1928

Inventor
John E. Roos.
By Geo Stevens
Attorney

Patented Apr. 14, 1931

1,801,055

UNITED STATES PATENT OFFICE

JOHN E. ROOS, OF DULUTH, MINNESOTA

PASTE POT

Application filed August 13, 1928. Serial No. 299,190.

This invention relates to paste pots and has special reference to a receptacle particularly adapted for use by paper hangers or similarly employed artisans, the principal object being to provide a conveniently shaped receptacle having novel advantages when in use as well as while being transported from place to place.

Other objects and advantages of the invention will appear in the further description thereof.

Figure 2:
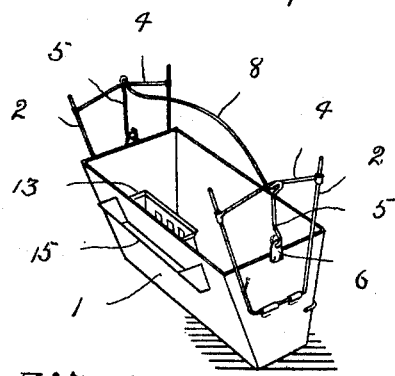

Referring now to the accompanying drawing, forming part of this application, and wherein like reference characters indicate like parts:

Figure 1 is a perspective view of one of the improved pots or receptacles as it would appear in position for use; and Figure 2 is a somewhat reduced similar view of the opposite side showing the receptacle in position for transportation.

The necessity for a conveniently shaped receptacle for use by paper hangers is well understood by those versed with the art, the handling of paste and the like necessitating uniform and quick action, in view of which my present invention is designed as before stated both for convenience of shape as well as embodying the provision of means whereby the receptacle may be conveniently positioned at all times.

1 represents the body portion of the receptacle which is preferably rectangular in shape, somewhat greater in length than in width, and with downwardly converging sides, terminating at a point where they are approximately half the distance apart than they are at their uppermost extremity, and the end members are preferably parallel.

Upon each end member is pivotally attached approximately centrally of its height, a pair of legs indicated at 2, the pivotal connection being accomplished preferably as by the fastening clips 3 which are soldered or otherwise attached to the outer face of the end members. Each pair of legs are of approximately the same shape as the end of the receptacle so that when in either extreme position they extend either above or below the receptacle about half of their length. The cross bar 4 is spaced somewhat remote from the extreme ends of the legs and is arcuate in form or angular as preferred so that its center portion extends away from the pivotal end thereof, this particular shape being for the provision of cooperation with the handle 5 of the pot.

The handle 5 is pivotally attached to suitable lugs 6, one fixed to either end of the pot and protruding above the upper edge thereof, and is provided with a loop-like corner as at 7 just above each lug, and intermediate of these looped corners is arched upwardly as indicated at 8, forming a conveniently shaped handle.

The cooperation existing between the legs and handle occurs when the former are folded upwardly against the upper portion of each end as clearly shown in Figure 2 of the drawing, and for such cooperation the handle is positioned at an angle when the legs are raised so that the cross bars 4 of the latter overlap the looped corners of the handle. Then the handle is raised to its vertical position resulting in a spring like connection between the legs and the handle which results in the latter being firmly held in ideal position for conveyance of the pot from place to place at such times when it sets upon its own bottom.

In Figure 1 the pot is shown standing upon its legs and thus elevated to a convenient height for access by the workman, and in such position the legs are firmly held against the lower portion of the ends of the pot by the locking bar 9 which is pivotally fixed to one side of the receptacle as by the clips 10, similar to the clips 3, which hold the legs. Intermediate of the clips 10 the bar is looped as at 11 forming a crank for manual manipulation thereof. The extreme ends of the rod 9 are bent at right angles as at 12 so that when the loop 11 is in raised position the angular termini thereof will be free from engagement with the legs, but when in the position shown they will overlap the legs and hold them tightly against the ends of the pot.

Upon one of the inner sides of the pot and centrally thereof is formed a rectangularly shaped bottomless pocket 13, having openings 14 upon the inner wall thereof, said pocket being for the reception of the paper hanger's brush where it will drain readily into the pot.

Upon the outer face of preferably the same side wall is formed a somewhat similarly shaped pocket 15, but having a bottom therein for the reception of other of the user's tools, such as cutting tools, and the like.

From the above it is evident that I have devised an exceedingly practical and convenient paper hanger's paste pot, and having thus described one embodiment thereof, what I claim and desire to secure by Letters Patent, is:

1. Supporting and transporting mechanism for a receptacle comprising a handle for the receptacle, pivotally mounted legs upon the ends of the body portion thereof, and means whereby the legs may be made to cooperate with the handle in holding same in upright position for the purpose described.

2. Supporting and transporting mechanism for a receptacle comprising a handle for the receptacle, pivotally mounted legs carried by the receptacle, means whereby the legs may be made to cooperate with the handle in supporting same in upright position, and means whereby the legs may be made to firmly support the receptacle.

3. Supporting and transporting mechanism for a receptacle comprising a pivotally mounted handle and pivotally mounted legs, adjustable means whereby the legs may be made to firmly support the receptacle, and means whereby the legs and handle may cooperate to hold each other in upright position for transportation of the receptacle.

In testimony whereof I affix my signature.

JOHN E. ROOS.